United States Patent [19]
Squyres

[11] Patent Number: 5,516,174
[45] Date of Patent: May 14, 1996

[54] GRAPPLE DEVICE FOR HANDLING BALLED TREES AND SHRUBS

[76] Inventor: Lee Squyres, R.D. 1 Box 104, New Ringgold, Pa. 17960

[21] Appl. No.: 235,541

[22] Filed: Apr. 29, 1994

[51] Int. Cl.$^6$ ........................................ B66C 1/42
[52] U.S. Cl. ................. 294/86.41; 294/88; 414/735
[58] Field of Search ..................... 294/86.41, 88, 294/106, 110.1, 115; 414/626, 732, 735, 739; 37/187

[56] References Cited

U.S. PATENT DOCUMENTS

| | | | |
|---|---|---|---|
| 2,725,996 | 12/1955 | Britton | 37/187 |
| 3,045,368 | 7/1962 | Whitcomb | 37/2 |
| 3,439,818 | 4/1969 | O'Neil | 214/147 |
| 3,460,329 | 8/1969 | Overstreet, Jr. | 294/88 |
| 3,472,401 | 10/1969 | Scaperotto | 414/626 |
| 3,512,276 | 5/1970 | Juhl | 37/2 |
| 3,618,800 | 11/1971 | Collins et al. | 414/739 |
| 3,651,966 | 3/1972 | Willett | 294/86.41 |
| 3,717,944 | 2/1973 | Clegg | 37/2 |
| 3,889,402 | 6/1975 | Wheeler et al. | 37/2 R |
| 3,902,614 | 9/1975 | Roberts et al. | 294/86.41 |
| 4,005,895 | 2/1977 | Cullings | 294/86.41 |
| 4,067,369 | 1/1978 | Harmon | 144/34 R |
| 4,271,611 | 6/1981 | Paul | 37/2 R |
| 4,280,785 | 7/1981 | Albrecht | 414/735 |
| 4,332,093 | 1/1982 | Berthollet | 37/2 R |
| 4,403,427 | 9/1983 | Dahlquist | 37/2 R |
| 4,426,110 | 1/1984 | Mitchell et al. | 294/88 |
| 4,441,852 | 4/1984 | Dixon | 294/88 |
| 4,810,018 | 3/1989 | van de Ven et al. | 294/88 |
| 5,073,080 | 12/1991 | Blum | 294/86.41 |

OTHER PUBLICATIONS

DPM, Inc., Nursery Jaws brochure, 2 pp., No Date.
DPM, Inc., Nursery Jaws II brochure, 2 pp., No Date.
Ball–Cat, Ball–Cat advertisement, 1p., No Date.
FFC, Pallet Forks advertisement, 1 p., Apr., 1992.
FFC, Power Forks advertisement, 1 p., April, 1992.
Vermeer Manufacturing Co., Model BG 1500 Ball Grapple advertisement, 1 p., No Date.

*Primary Examiner*—Dean Kramer
*Attorney, Agent, or Firm*—John P. Blasko

[57] ABSTRACT

Handling equipment and a grapple device for handling balled plant loads such as trees and shrubs are disclosed. The grapple device which may be pivotally mounted on any suitable vehicle has a lengthwise frame. A pair of pivot rotary actuators having their rotational axes oriented transversely to each other are attached to the end of the frame. A grapple mechanism having pair of diametrically opposed grapple blades pivotally attached to a support member is fastened to one of the pivot rotary actuators. The grapple blades are opened or closed about the root ball of a plant by means of actuators, preferably hydraulic cylinder actuators. The grapple mechanism also has a slidably adjustable foot member which is positioned between the grapple blades to stabilize the plant load. The interior surfaces of the grapple blades and foot are adapted to engage the root ball of the plant.

20 Claims, 7 Drawing Sheets

GRAPPLE DEVICE FOR HANDLING BALLED TREES AND SHRUBS

FIELD OF THE INVENTION

The present invention relates to a device for handling balled trees and shrubs, particularly for loading the trees and shrubs that have their roots balled and bagged in the field onto transportation vehicles such as flatbed trucks.

BACKGROUND OF THE INVENTION

Typically, in the plant nursery industry, trees and shrubs are excavated and their root balls bagged for transplanting to a customer's site. Many different pieces of equipment have been proposed and are available to accomplish the excavation and balling of the plants. However, after the plants are "bagged and balled" in the field, they must be loaded onto a transportation vehicle such as a flatbed truck for transporting to another site such as a distributor or customer site. They must then be unloaded from the flatbed truck while awaiting further transportation or replanting.

In the process of loading and unloading, it is common for some of the plants to be damaged. Sometimes the damage can be as great as ten percent of the plant inventory being transported. The damaged plants are not desired by the customer and may be unsalable by a distributor. Another problem is the weight of the plants. Manual lifting and loading can require substantial labor and time. Other expenses may be incurred such as compensation for injury occurring to manual workers in the loading process.

Other devices have been proposed for handling the plants. However, each such proposed apparatus suffers shortcomings such as lack of maneuverability, overly time-consuming operation, requiring supplemental manual labor, potential hazard to laborers, or pre-positioning of the plants in order to use the apparatus. The equipment of the present invention obviates these problems and provides substantial advantages to the user. The equipment can grasp plants in an array of orientations and requires little or no supplemental labor for loading the plants for further transportation. This presents a substantial economic as well as labor-saving advantage. The equipment also, when properly operated, allows a substantial decrease in the number of plants damaged during loading. Generally, plants may be loaded and unloaded at a faster rate when compared to previously available equipment.

These and other features and advantages of the invention will be more fully understood from the following detailed description of the preferred embodiments which should be read in light of the accompanying drawings.

SUMMARY OF THE INVENTION

Handling equipment and a grapple device for handling balled plant loads such as trees and shrubs are disclosed. The grapple device which may be pivotally mounted on any suitable vehicle has a lengthwise frame. A pair of pivot rotary actuators having their rotational axes oriented transversely to each other are attached to the end of the frame. A grapple mechanism having a pair of diametrically opposed grapple blades pivotally attached to a support member is fastened to one of the pivot rotary actuators. The grapple blades are opened or closed about the root ball of a plant by means of actuators, preferably hydraulic cylinder actuators. The grapple mechanism also has a slidably adjustable foot member which is positioned between the grapple blades to stabilize the plant load. The interior surfaces of the grapple blades and foot are adapted to engage the root ball of the plant.

The grapple device for handling a balled plant is adapted for use in connection with a power-driven vehicle and comprises frame means having a lengthwise axis with one end thereof attached to the vehicle and grapple means comprising a support member having attached thereto: a pair of pivotally movable, diametrically opposed grapple blades each having an interior surface adapted to engage the root ball of the plant, a slidably adjustable foot means positioned between the grapple blades and having an interior surface adapted to engage the root ball of the plant, and a grapple actuating means for opening and closing the grapple blades about the root ball of the plant. There is an articulation means positioned between and secured to one end of the frame means and the grapple means. The articulation means has a first rotational means for rotating the grapple means about an axis transverse to the lengthwise axis of the frame means, and a second rotational means for rotating the grapple about an axis transverse to the rotational axis of the first rotational means. The device also has a control means for effecting actuation of the grapple actuation means and the first and second rotational means.

DETAILED DESCRIPTION OF THE PREFERRED EMBODIMENT

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 7 in particular, the apparatus of the present invention is disclosed.

Figure 1:
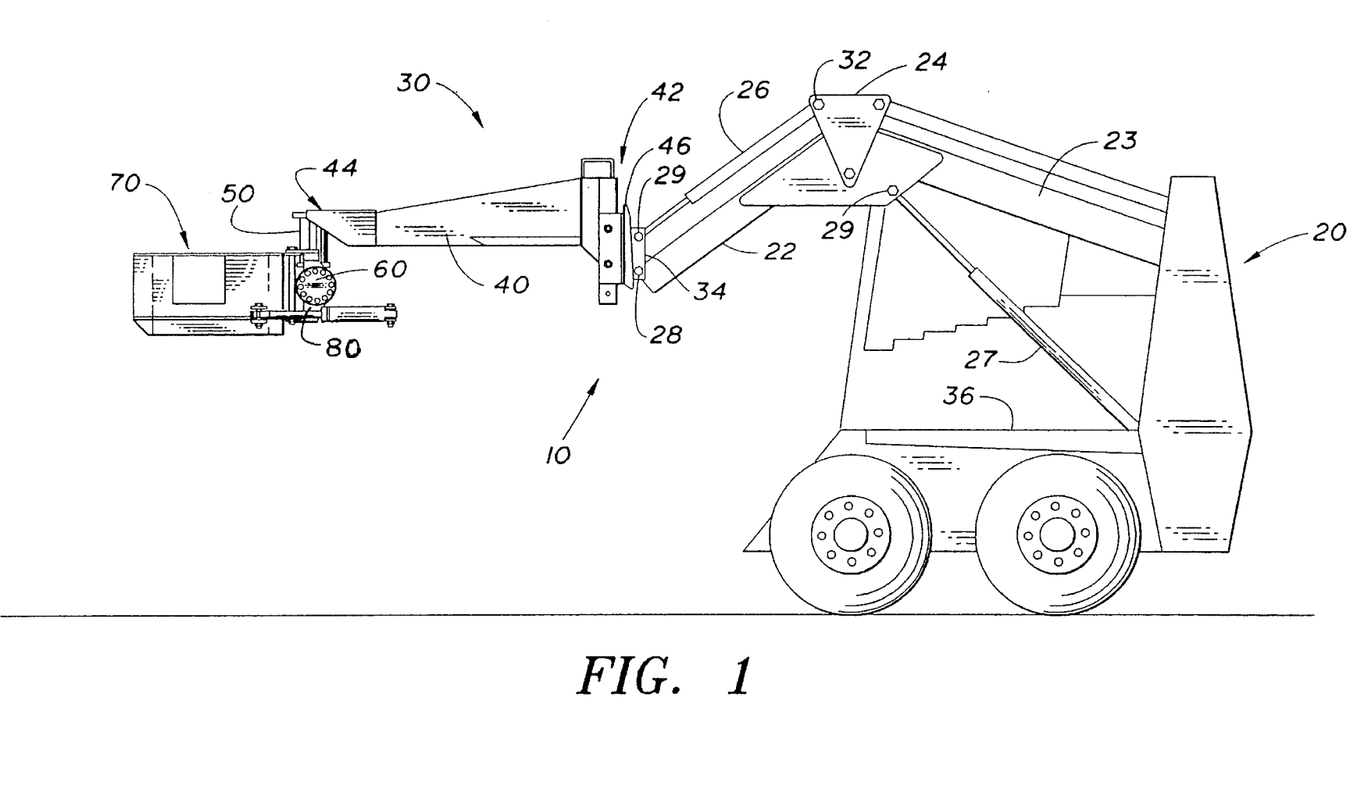
FIG. 1 is a side elevation view of a device according to the invention.
Figure 2:
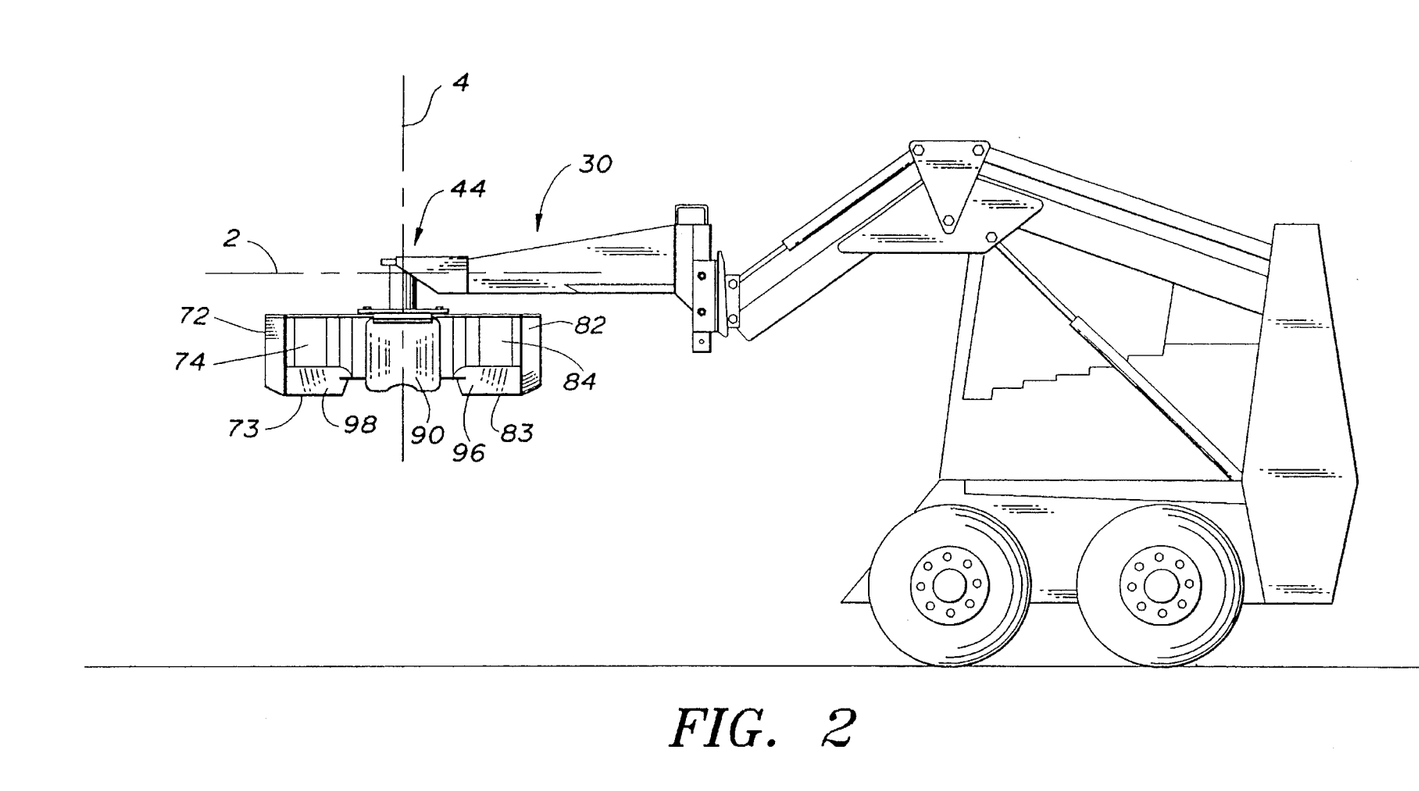
FIG. 2 is a side elevation view of the device having the grapple mechanism rotated to the side.

FIGS. 1 and 2 show the grapple equipment 10 having the grapple device which is generally indicated as 30 being connected to mounting plate 46 of a power driven vehicle generally designated as 20. The power driven vehicle 20 is illustrated in this application as a front end loader. However, it will be appreciated that other suitable vehicles may be used. A pair of double acting hydraulic cylinder actuators 26 (only one of which is shown) interconnect pivot plates 24 and bolt flange 34 of mounting plate 46. Mounting plate 46 is connected to lifting arm 22 at pivot bolt 28. Double acting hydraulic cylinder actuators 27 (only one of which is shown) is connected between vehicle frame 36 and pivot bolt 29. The operator controls actuators 26 and 27 to maintain the attitude and angle of grapple device 30 relative to vehicle 20 for the most effective handling of the plant load.

Grapple device 30 has as its principal components frame 40 attached to mounting plate 46 at frame end 42, rotational means 50 (for turning the grapple mechanism) attached to frame end 44, rotational means 60 (for tilting the grapple mechanism) attached to a grapple mechanism generally denoted as 70 at support member 80.

Figure 3:
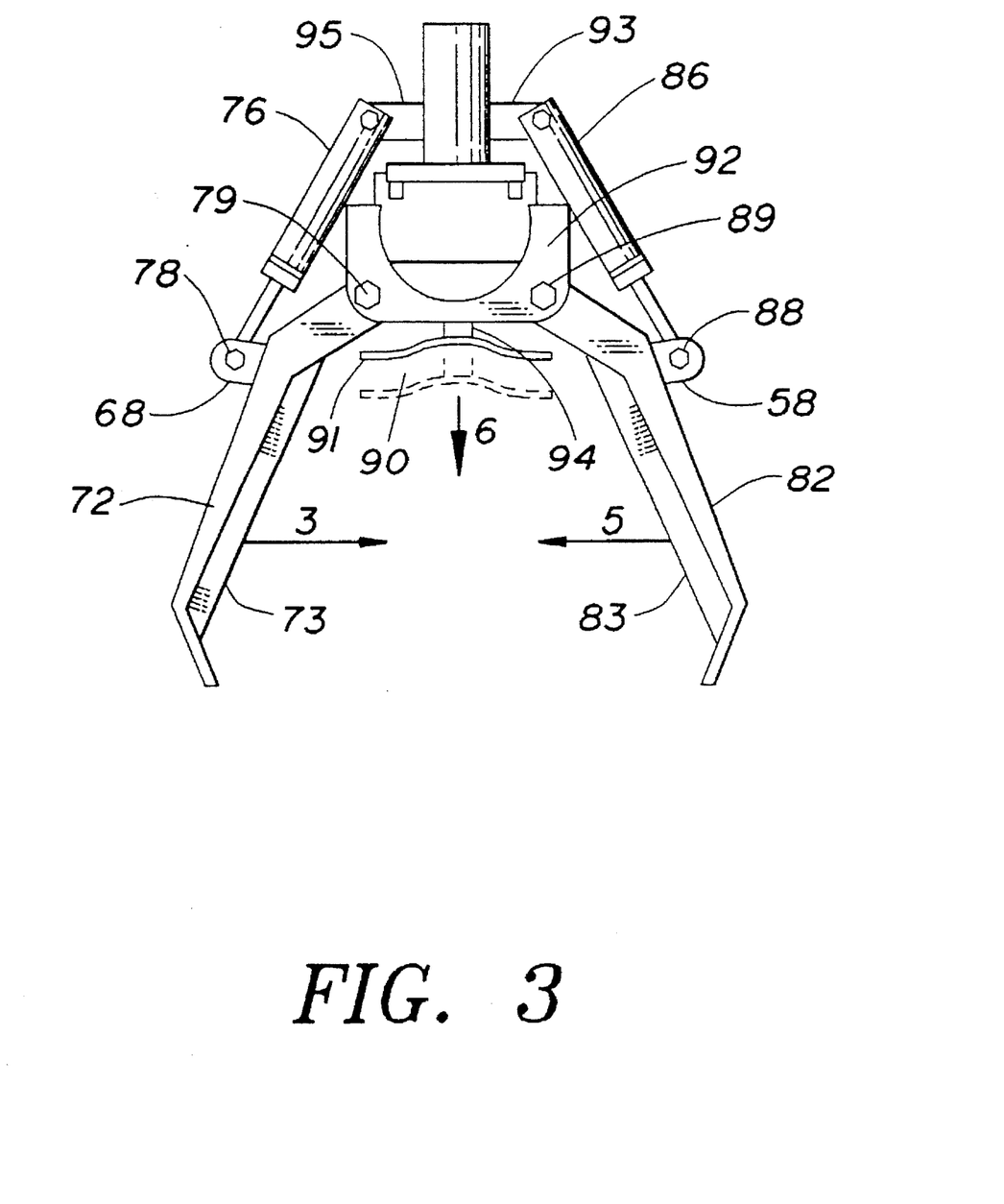
FIG. 3 is a top view of the grapple mechanism.
Figure 4:
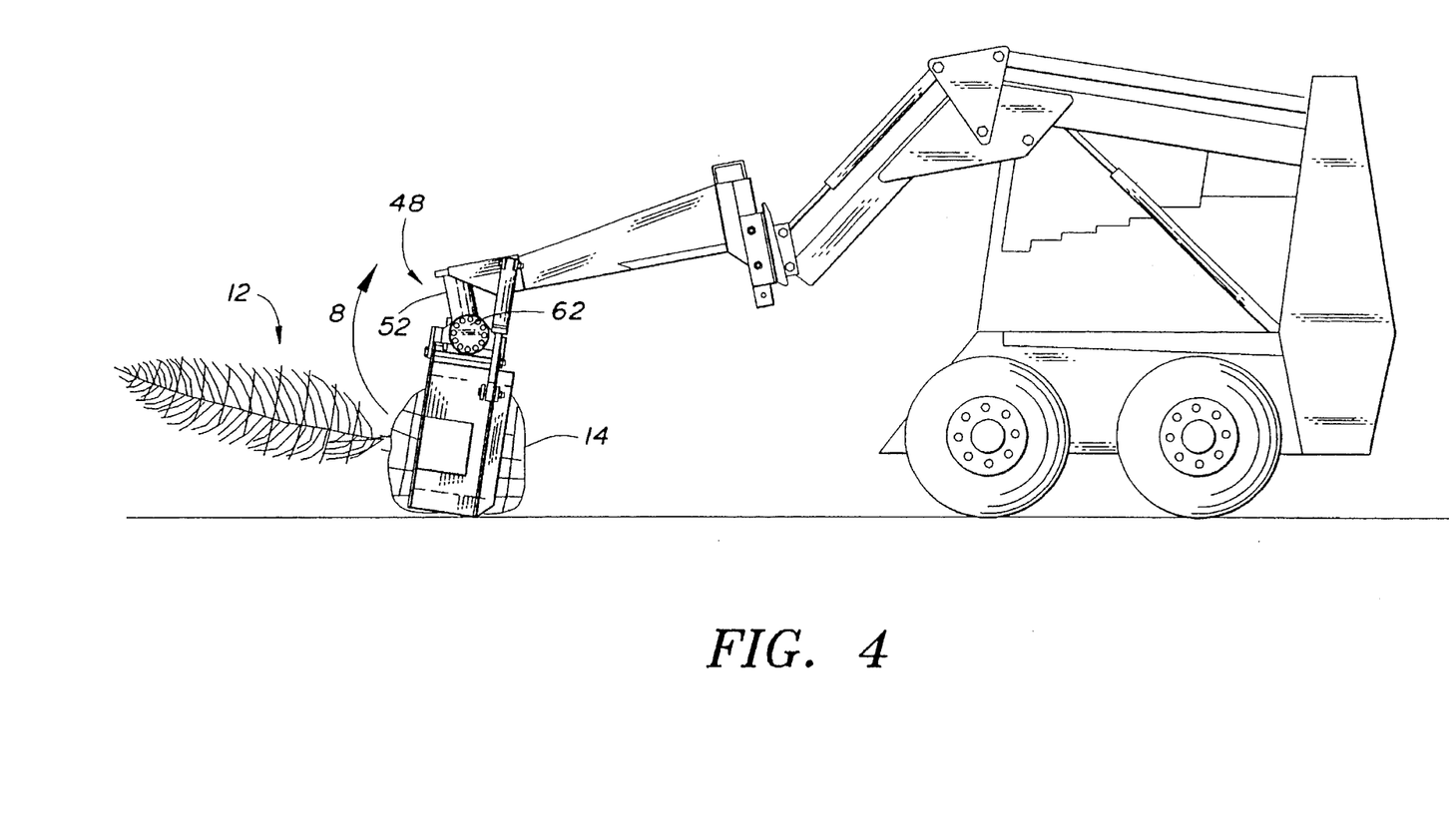
FIG. 4 is a side elevation view of the device illustrating the use of the device to grasp the root ball of a balled plant.

Referring to FIGS. 2, 3 and 4, grapple mechanism 70 has grapple blades 72 and 82 pivotally attached at bolts 79 and 89 respectively to support flange 92 of support member 80. The interior surfaces 74, 84 of blades 72, 82 are preferably beveled inwardly towards each other in regions 98 and 96 along lower edges 73 and 83 respectively to engage the lower portion of a root ball when the blades are closed upon the ball. Hydraulic cylinder actuators 76 and 86 are pivotally attached to support flanges 95 and 93 respectively and blade flanges 68 and 58 by pivot bolts 78 and 88 respectively. In use, actuators 76 and 86 cause blades 72 and 82 to extend in the direction of arrows 3 and 5 to grasp ball 14 of plant 12. It is preferred to use a pair of actuators in tandem to close the grapple blades in order to effect an even and smooth closing of the blades. However, a single actuator may be used on a single blade with the other blade remaining fixed or in connection with a transmission means or linkage to cause the blades to close in tandem.

Foot member 90 has face plate 91 mounted on foot arm 94. Preferably, face plate 91 is beveled and shaped to accommodate the root ball of a plant as in the case of the grapple blades 72 and 82. Because the root balls of various plant will differ in size, foot arm 94 is slidably adjustable relative to support member 80. The position of foot member 90 may be manually adjusted by incorporating a locking mechanism (not shown). However, preferably a suitable actuator may be mounted on the support member 80 to effect adjustments when desired so that the operator is not required to leave the cab of the front end loader to adjust the foot member. The foot member provides substantial stability in handling the plants.

Referring to FIGS. 2, 4, 5, 6 and 7, grapple device 30 has an articulation means 48 for rotating grapple mechanism 70 relative to frame 40. The articulation means comprises a pivot rotary actuator 52 attached at end 44 of frame 40. Actuator 52 rotates generally about an axis 4 which is generally transverse to lengthwise axis 2 of frame 40. Hydraulic motors and bearings may be used as rotational means 50 for turning grapple mechanism 70. However, when a pivot rotary actuator of the type herein described is used, the grapple mechanism may be turned up to at least 270°. A second pivot rotary actuator 62 is attached to actuator 52 such that the rotational axis of actuator 62 is generally transverse to the rotational axis actuator 52. Hydraulic cylinder actuators and a suitable carriage may be used as rotational means 60 to effect the tilting of grapple mechanism 70. However, when a pivot rotary actuator of the type herein described is used, the grapple mechanism may be tilted up to 100° about the rotational axis. This degree of rotational freedom permits the plant to be properly oriented even when the plant was not squarely grasped by the grapple mechanism. Support member 80 of grapple mechanism 70 is attached to actuator 62. Pivot rotary actuators disclosed in U.S. Pat. Nos. 4,422,366, 4,741250, 4,846,007 and 4,906161, the disclosures of which are hereby incorporated by reference, may be used and are preferred.

Figure 5:
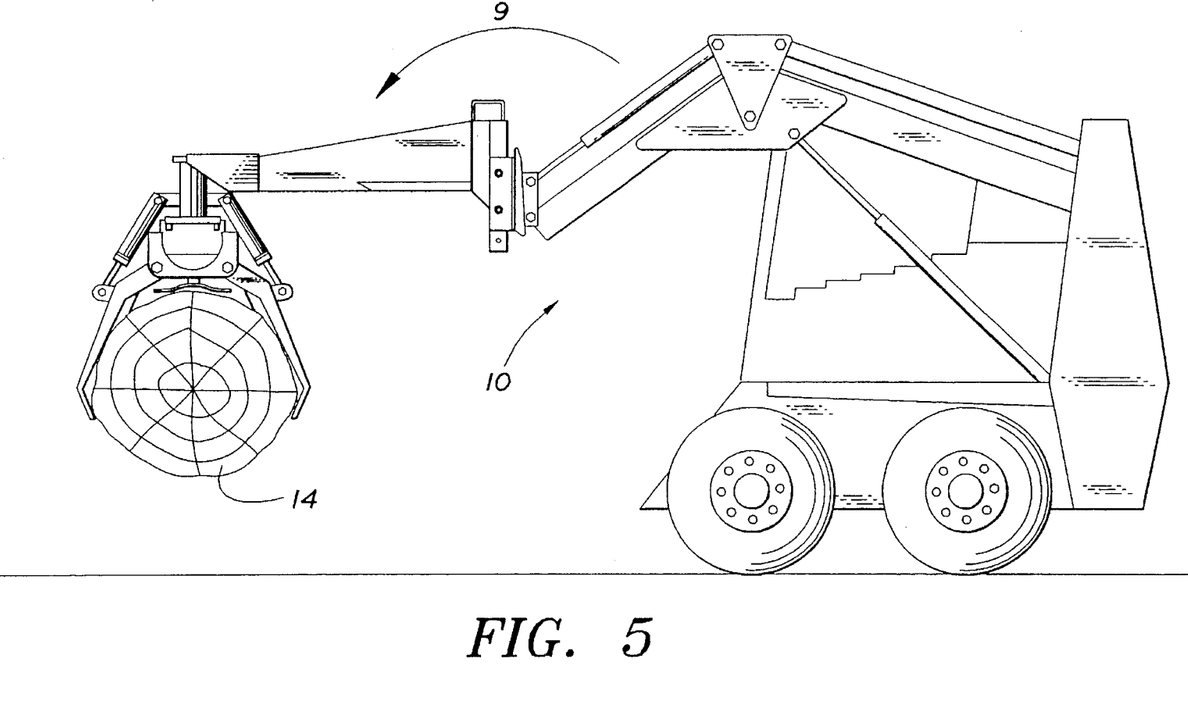
FIG. 5 is a side elevation view of the device illustrating the use of the device.
Figure 6:
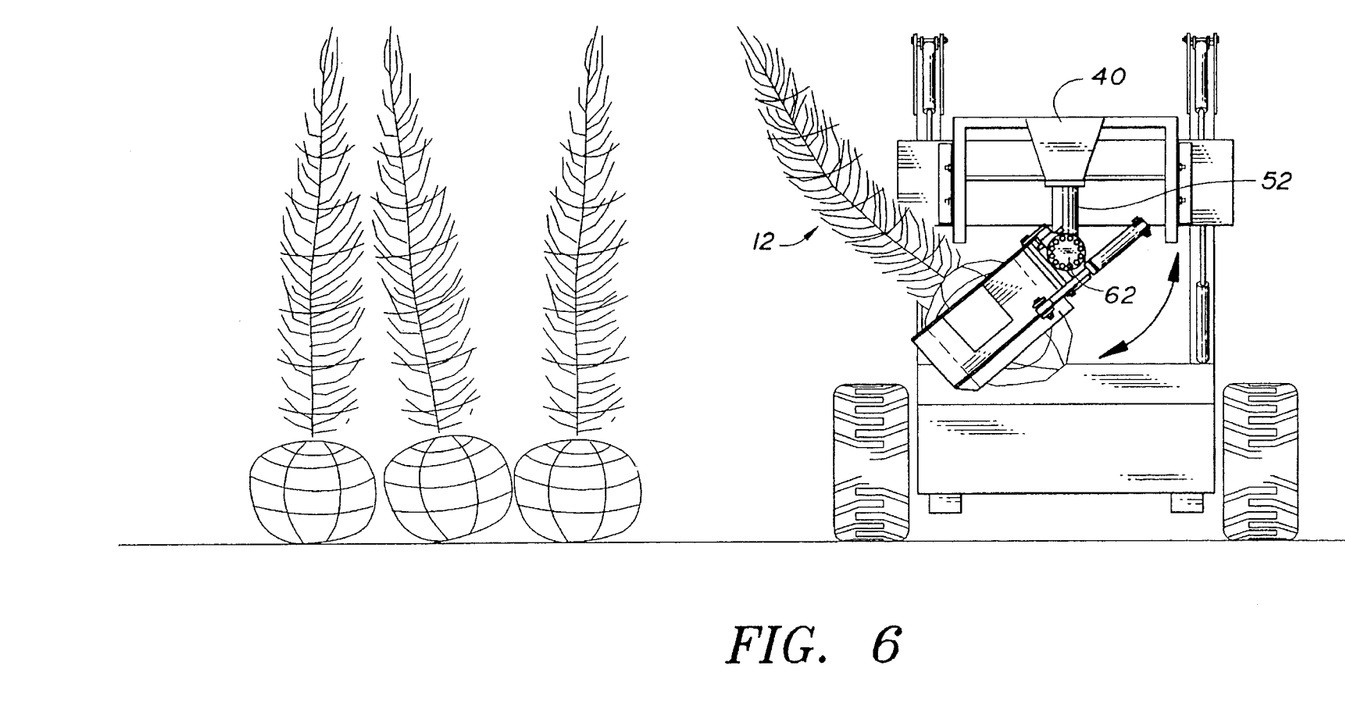
FIG. 6 is a front elevation view of the device illustrating the use of the device to rotate the orientation of the balled plant.
Figure 7:
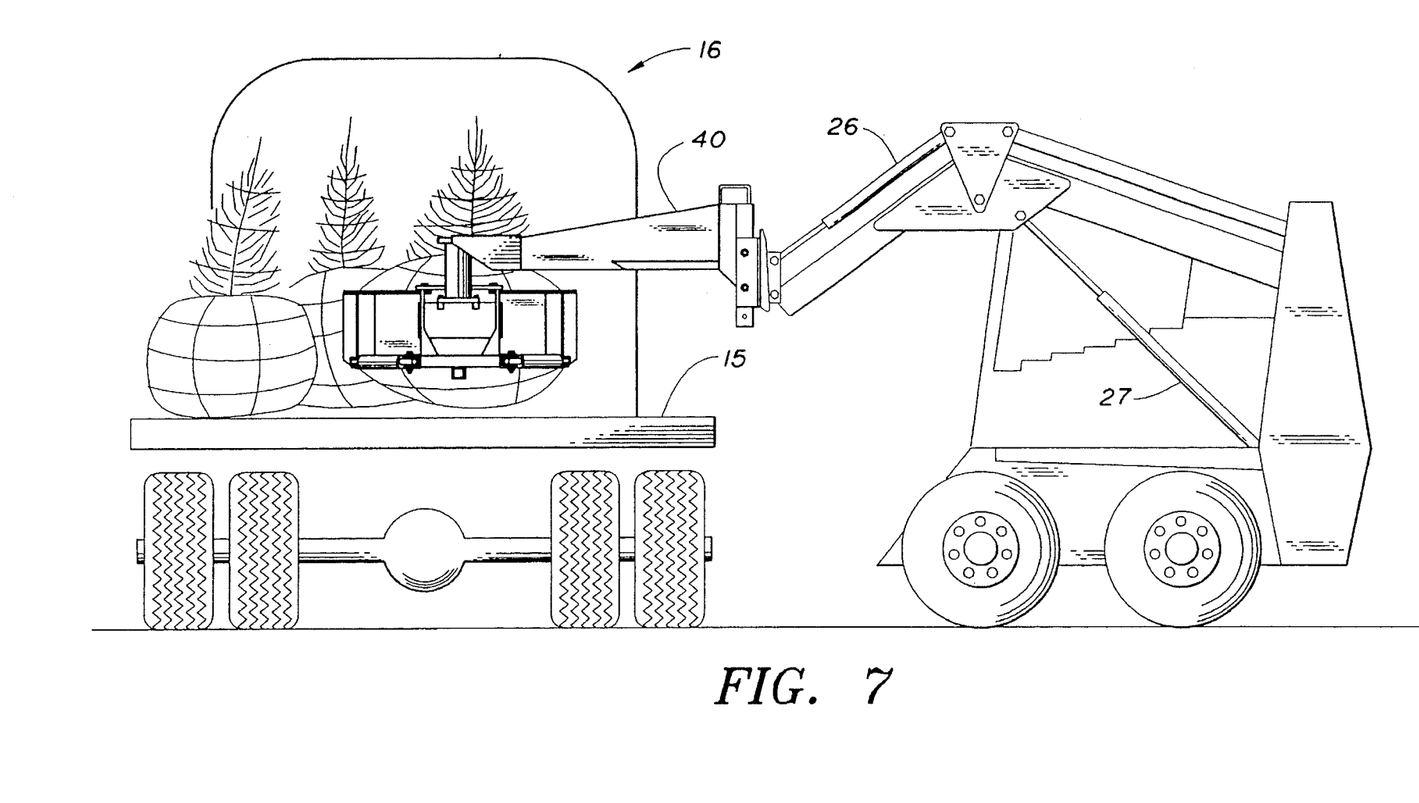
FIG. 7 is a side elevation view of the device illustrating the use of the device to load balled plants onto a flatbed truck.

In use, frame 40 is rotated, and grapple blades 72 and 82 are closed on root ball 14 of plant 12. Pivot actuator 62 is then rotated in the direction of arrow 8 to orient the plant in along a generally vertical direction. The plant 12 is then placed on deck 15 of truck 16 by raising frame 40 by means of hydraulic cylinder actuators and retracting grapple blades 72 and 82 when plant 12 is positioned over deck 15.

It is preferred to use hydraulic actuators to actuate the grapple blade movement, pivot rotation of the grapple mechanism and foot member positioning. Any suitable control means (not shown) known in the art may be used. However, it is preferred to use an electric solenoid valve control system to control hydraulically powered actuating systems. Such an electric solenoid valve control system is preferably housed in the frame 40 of the grapple device with the electric switches mounted in the operator's cab of the front end loader. This permits easier installation of the grapple device 30 on mounting plate 46, because hydraulic systems of grapple device 30 do not have to be tied into the hydraulic systems of front end loader 20. It also provides additional ease of use of the grapple device by the operator, because the control switches are not linked to auxiliary hydraulic system and controls of the front end loader.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A grapple device for handling a balled plant adapted for use in connection with a power-driven vehicle, comprising:

frame means having a lengthwise axis with one end thereof attached to the vehicle;

grapple means comprising a support member having attached thereto: a pair of pivotally movable, diametrically opposed grapple blades each having an interior surface adapted to engage the root ball of the plant, a slidably adjustable foot means positioned between the grapple blades and having an interior surface adapted to engage the root ball of the plant, and a grapple actuating means for opening and closing the grapple blades about the root ball of the plant;

articulation means positioned between and secured to one end of the frame means and the grapple means, the articulation means comprising a first rotational means attached to the frame means for rotating the grapple means about an axis transverse to the lengthwise axis of the frame means and in a generally vertical orientation when the lengthwise axis is in a horizontal position, and a second rotational means for rotating the grapple means about an axis transverse to the rotational axis of the first rotational means; and control means for effecting actuation of the grapple actuating means and the first and second rotational means.

2. The grapple device according to claim 1 wherein the frame means is pivotally attached to the vehicle.

3. The grapple device according to claim 1, wherein at least one of the rotational means is a pivot rotary actuator.

4. A grapple device according to claim 3, wherein the pivot rotary actuator is hydraulically driven.

5. A grapple device according to claim 4, wherein the grapple actuating means comprises a pair of hydraulic cylinder actuators.

6. A grapple device according to claim 5, wherein the control means comprises an electric solenoid valve means for controlling the pivot rotary actuator and hydraulic cylinder actuators.

7. A grapple device according to claim 1, wherein the first and second rotational means are pivot rotary actuators.

8. A grapple device according to claim 7, wherein the pivot rotary actuators are hydraulically driven.

9. A grapple device according to claim 8, wherein the grapple actuating means comprises a pair of hydraulic cylinder actuators.

10. A grapple device according to claim 9, wherein the control means comprises an electric solenoid valve means for controlling the pivot rotary actuators and hydraulic cylinder actuators.

11. A grapple device according to claim 10, wherein the grapple means further comprises actuating means for adjusting the position of the foot means relative to the ball of the plant.

12. A grapple device according to claim 1, wherein the grapple means further comprises actuating means for adjusting the position of the foot means relative to the ball of the plant.

13. Grapple equipment for handling a plant load having its roots balled comprising:

a power-driven vehicle having pivotally attached thereto a frame means having a lengthwise axis;

actuating means for pivoting the frame means about its pivotal connection to the vehicle;

grapple means comprising a support member having attached thereto: a pair of pivotally movable, diametrically opposed grapple blades each having an interior surface adapted to engage the root ball of the plant load, a slidably adjustable foot means positioned between the grapple blades and having an interior surface adapted to engage the ball of the plant load, and a grapple actuation means for opening and closing the grapple blades about the ball of the plant load;

articulation means positioned between and secured to one end of the frame means and the grapple means, the articulation means comprising a first rotational means attached to the frame means for rotating the grapple means about an axis transverse to the lengthwise axis of the frame means and in a generally vertical orientation when the lengthwise axis is in a horizontal position, and a second rotational means for rotating the grapple means about an axis transverse to the rotational axis of the first rotational means; and control means for effecting actuation of the grapple actuation means, frame pivot actuating means, and the first and second rotational means.

14. Grapple equipment according to claim 13, wherein the first and second rotational means are hydraulically driven pivot rotary actuators.

15. Grapple equipment according to claim 14, wherein the grapple actuating means comprises a pair of hydraulic cylinder actuators.

16. A grapple device for handling a balled plant adapted for use in connection with a power-driven vehicle, comprising:

frame means having a lengthwise axis, pivotally attached at one end thereof to the vehicle;

a first hydraulic pivot rotary actuator attached to the other end of the frame means having its rotational axis transverse to the lengthwise axis of the frame means and in a generally vertical orientation when the lengthwise axis is in a horizontal position;

a second hydraulic pivot rotary actuator attached to the first rotary actuator and having its rotational axis transverse to the rotational axis of the first rotary actuator;

grapple means comprising a support member having attached to the second rotary actuator, the support member having attached thereto: a pair of pivotally movable, diametrically opposed grapple blades each having an interior surface adapted to engage the root ball of the plant, a slidably adjustable foot means positioned between the grapple blades and having an interior surface adapted to engage the root ball of the plant, and a grapple actuation means for opening and closing the grapple blades about the root ball of the plant;

control means for effecting actuation of the grapple actuation means and the first and second pivot rotary actuators.

17. A grapple device according to claim 16, wherein the grapple device further comprises hydraulic actuating means for adjusting the position of the foot means relative to the ball of the plant, and the grapple actuating means comprises a pair of hydraulic cylinder actuators, and the control means comprises electric solenoid valve means for controlling the pivot rotary actuators, hydraulic actuating means and hydraulic cylinder actuators.

18. A grapple device for handling a balled plant adapted for use in connection with a power-driven vehicle, comprising:

frame means having a lengthwise axis with one end thereof attached to the vehicle;

grapple means comprising a support member having attached thereto: a pair of diametrically opposed grapple blades each having an interior surface adapted to engage the root ball of the plant with at least one of the blades being pivotally attached to the support member, and a grapple actuating means for opening and closing the grapple blades about the root ball of the plant;

articulation means positioned between and secured to one end of the frame means and the grapple means, the articulation means comprising a first rotational means attached to the frame means for rotating the grapple means about an axis transverse to the lengthwise axis of the frame means and in a generally vertical orientation when the lengthwise axis is in a horizontal position, and a second rotational means for rotating the grapple means about an axis transverse to the rotational axis of the first rotational means; and control means for effecting actuation of the grapple actuating means and the first and second rotational means.

19. A grapple device according to claim 18, wherein the grapple means further comprises a foot means positioned between the grapple blades and having surface adapted to engage the root ball of the plant.

20. A grapple means according to claim 19, wherein the foot means is slidably movable relative to the support member.

* * * * *